Patented Dec. 16, 1924.

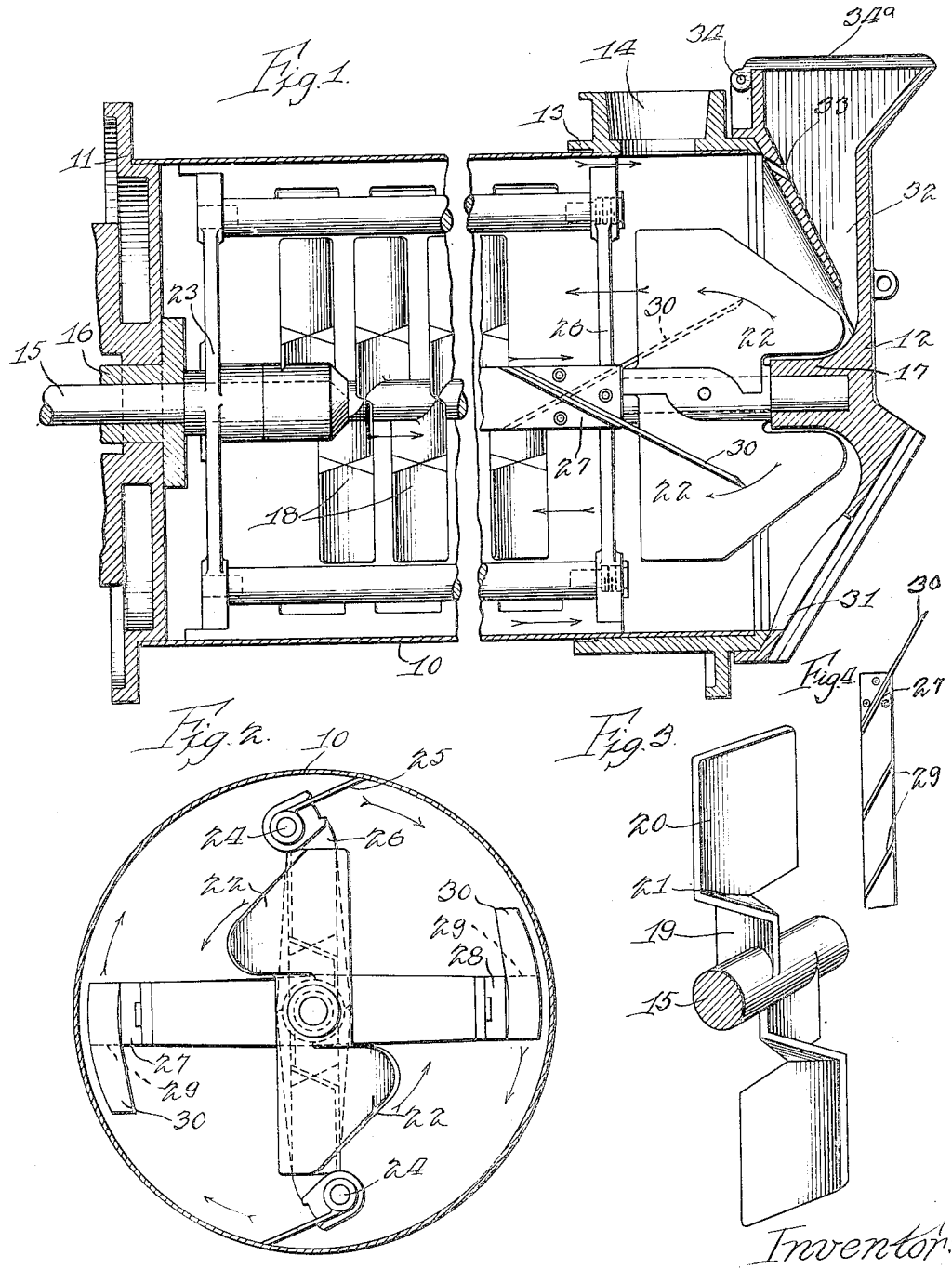

1,519,746

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER AND METHOD OF CHANGING THE TEMPERATURE OF FLUIDS.

Application filed March 22, 1920, Serial No. 367,646. Renewed May 23, 1924.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Ice-Cream Freezers and Methods of Changing the Temperature of Fluids, of which the following is a specification.

My invention relates to the handling of fluids and more particularly to temperature-changing devices employed in handling fluid dairy products such as milk and the like.

One object of my invention is to devise an improved method of circulating a fluid while its temperature is being changed and to provide means for carrying out the method.

The particular means I have selected to illustrate my improved method embodies structures accomplishing the other purposes of my invention which are to provide an improved means for emulsifying or mixing air with the fluid, improved means for injecting or inserting fruit or flavoring material, and an improved arrangement for permitting the operator to observe the condition of the fluid.

Another object is to provide an ice cream freezer into which the fluid mix may be freely poured without possibility that in entering it will encounter some stationary part which will splash a portion of it out of the aperture through which it is entering.

Further objects and advantages of my invention will become apparent as the description proceeds.

In the accompanying drawings Figure 1 is a central section through an ice cream freezer in which the principles of my invention have been embodied. Fig. 2 is an end view of the beater and the shell surrounding the same. Fig. 3 is a perspective view of two of the beater blades. Fig. 4 is a detail view of one of the sweep bars.

In the embodiment of my invention selected for illustration the fluid receptacle or freezer cylinder comprises a tubular shell 10 closed at its rear end by any suitable end piece such as that illustrated at 11, and at its front end by a detachable head 12. Adjacent its front end it is preferably reinforced by a ring 13 the upper portion of which is apertured at 14 to allow the mixture to be poured into the freezer. The ring 13 and rear closure 11 have annular flanges adapted to support suitable cooling means, which, as they form no part of my present invention, have not been illustrated.

Means are provided for agitating or circulating the fluid in the freezer cylinder, comprising a central beater, the shaft 15 of which is rotatably supported at its ends in a sleeve 16, and a boss 17, respectively. A plurality of blades 18 are carried by the shaft 15 each blade comprising an inner portion 19 set at an angle so as to feed the material longitudinally of the shaft and an outer portion 20 set at a reverse angle so as to feed material in the opposite direction. A flat portion 21 unites the inner end of the outer portion 20 to the outer end of the inner portion 19, the entire blade being preferably one integral piece. The series of blades 18 extends longitudinally from near the rear, stopping a substantial distance back from the removable head 12, leaving a space the greater part of which is subject to the agitation produced by a pair of blades 22 of approximately helicoidal shape and pitched to feed the material in the same direction as the outer portions 20 of the blades 18.

The sleeve 16 is itself rotatable in the rear closure 11 and actuates a four-armed spider 23. Longitudinally extending shafts 24 on two opposite arms carry scraper blades 25 adapted to scrape the outside of the cylinder to prevent material freezing to it and extending toward the front end of the cylinder, terminating a trifle short of the blades 22 and supported at their front ends by another spider 26. On the other two arms of the spider, sweep bars 27 and 28 are mounted each having a plurality of inclined vanes 29 adapted to move near the outside of the cylinder and shift the material longitudinally.

Any suitable means may be provided for rotating the shaft 15 and the sleeve 16 simultaneously in opposite directions. In use the parts are driven so that the sweep bars 27 and 28 move material toward the front end of the freezer. The front ends of the sweep bars carry long vanes 30 having in this instance the same pitch as vanes 29 and adapted to feed the material forward and terminating just short of the extreme end of the cylindrical portion of the cylinder. Their ends pass by the discharge opening 31 and in emptying the cylinder facilitate the discharge of material through said opening. The shaft 15, being driven in the opposite direction, actuates the front blades 22 so that they and the outer portions 20 of the blades 18 move material toward the rear, while the inner portions 19 of the blades 18 will move material toward the front. It will be apparent that when the cylinder is approximately full of material there will be a central core of material moving toward the front, an annular body of material outside the central core moving toward the rear, and another annular body of material moving toward the front under the action of the sweep bars 27 and 28.

This double circulation is particularly advantageous in rapidly bringing all parts of the mixture to uniform temperature and maintaining them thus while the temperature is being changed. The portion of the mixture which has moved along the outer shell and suffered a change of temperature has its direction of motion reversed at the front end and at that point is mixed quickly with a substantial portion of material coming to the front end along the central core so that the intermediate body moving toward the rear will be of a fairly uniform temperature and after being thoroughly mixed will arrive at the rear end entirely uniform in temperature, to be again subdivided. During its passage from the rear to the front it is practically impossible to cool the outside layer of material to more than a certain depth depending on the speed with which the material moves and the efficiency of the temperature changing means outside the cylinder and it is therefore useless to move a thicker layer than can be cooled which would turn around on reaching the front end and move back toward the rear in two layers, one cold and one warm, the cold layer of which would lie along the axis and would a second time be carried to the outside upon reaching the rear.

The head of my improved freezer has a funnel-shaped opening or passageway 32 in its upper part into which chopped fruit or similar material may be poured. The blades 22 extend into close proximity with the lower end of this inlet and when in operation will continuously remove the material adjacent the bottom of the inlet. This not only quickly removes fruit placed in the inlet passage, but it draws away the material with sufficient rapidity to entrap air at this point which, especially after the material has become somewhat viscous, will be carried back in bubbles toward the rear end of the machine, the bubbles being broken up by the blades 18 and becoming mixed with the material.

A slot 33 extending from side to side of the inlet 32 is provided in the rear wall of the inlet and performs a triple function. After the material inside has swelled to the level of the slot, a continuous flow through the slot will take place which will mingle with any fruit placed in the inlet passage and carry it quickly down into the cylinder. The inception of this flow may be readily observed by the operator and will indicate the volume of the material in the cylinder, and the material flowing may also be readily observed or even sampled to determine its texture, consistency, and other properties, which as the process nears completion can be conveniently watched so as to empty the freezer at the proper time. Any suitable covering device or lid 34$^a$ may be pivoted at 34 and normally cover the passageway 32.

It will be noted that vanes 30 if they happen to be directly under the mix opening 14 when the mix is poured in, will lie vertical and therefore will not tend to deflect or splash a portion of the mix back out of the inlet. The only object the material flowing through the inlet can strike against so as to splash in all directions would be the shaft 15, and blades 22 in case they happen to be approximately horizontal. This splashing would occur down near the center of the cylinder where it would be desirable rather than otherwise as it could hardly splash back out of the inlet and would churn the material somewhat, causing it to absorb air, and assisting in the process of emulsifying.

While I have illustrated and described in detail a preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. The herein described method of circulating a fluid comprising moving a central core and an outer envelope parallel to each other in the same direction and returning the fluid in the opposite direction in an annular mass moving between the central core and the outer envelope.

2. The method of circulating fluid subject to temperature change, which comprises moving a layer of the fluid across a temperature changing surface, mixing said layer with another portion at the end of its path, and returning the two portions intermingled to the initial position.

3. The method of circulating a fluid from end to end of a receptacle, comprising dividing the fluid at one end into two portions, moving one of said portions out to form an envelope and the other portion in to form a core, carrying both said portions to the opposite end of the container and there reuniting them.

4. The method of circulating a fluid subjected to temperature change comprising dividing the fluid into two portions, passing one portion over a temperature changing surface and subsequently mingling it with the other portion.

5. The method of circulating a fluid subjected to temperature change comprising dividing the fluid into two portions, passing one portion over a temperature changing surface and subsequently mingling it with the other portion, the portion passed over said temperature changing surface being of a depth substantially equal to the depth to which the temperature changing action will penetrate during the passage of said portion over said surface.

6. In a device of the class described, a container, agitating means in said container, an inlet in said container normally unaffected by said agitating means, and an inlet in said container acted upon by said agitating means to draw material into the container.

7. In a device of the class described, a container, an inlet near one end of said container, agitating means in said container extending from the opposite end to terminate at a point longitudinally spaced from under said inlet, and different agitating means occupying the portion of said container under said inlet, the agitating means under said inlet being adapted to agitate the material without at any time obstructing said inlet.

8. In a device of the class described, a receptacle, an inlet passageway opening into said receptacle a substantial distance below the upper portion thereof, and agitating means within said receptacle adapted to periodically draw material into said receptacle through the end of said passageway and to move said material into the body of other material being agitated in said receptacle.

9. In a device of the class described, a receptacle, an inlet passageway opening into said receptacle a substantial distance below the upper portion thereof, and agitating means within said receptacle operating in proximity to said opening and adapted to periodically draw material into said receptacle through said passageway with sufficient force to entrap air in the material within the receptacle.

10. In a device of the class described, a receptacle, an inlet passageway extending downward a substantial distance below the upper portion of said receptacle, means within said receptacle adapted to periodically draw material into said receptacle through the end of said passageway, and a passageway adjacent the upper portion of said receptacle communicating with said first mentioned passageway and the interior of said receptacle.

11. In a device of the class described, a pair of longitudinally spaced rotatable carriers, agitating means supported by said carriers, a receptacle enclosing said carriers and agitating means, one end of said receptacle being adjacent one of said carriers and the other end being spaced longitudinally from the other carrier, and centrally located means adjacent the spaced end of said receptacle adapted to move material away from said end.

12. In a device of the class described, a pair of longitudinally spaced rotatable carriers, agitating means supported by said carriers, a receptacle enclosing said carriers and agitating means, one end of said receptacle being adjacent one of said carriers and the other end being spaced longitudinally from the other carrier, and means adjacent the spaced end of said receptacle adapted to move material centrally located away from said end and to move material peripherally located toward said end.

13. In a device of the class described, a receptacle, a longitudinally extending member rotatable therein, blades carried by said member, the outer portion of said blades being adapted to move material in one direction from end to end of the receptacle, and the inner portions of said blades adjacent said member being adapted to move material in the opposite direction.

14. In a device of the class described, a receptacle, outer agitating means therein adapted to move material adjacent the wall of said receptacle longitudinally in one direction, and inner agitating means adapted to move a central core of material in the same longitudinal direction and an intermediate portion of material between said core and the outer portion in the opposite direction.

15. In a device of the class described, a receptacle, agitating means in said receptacle adapted to move material adjacent the periphery of said receptacle longitudinally in one direction, central agitating means adjacent one end of said receptacle adapted to move material in the opposite direction and central agitating means occupying substantially the remainder of the longitudinal extent of said receptacle adapted to move a central core of material in the original direction and an envelope surrounding said central core in the opposite direction.

16. In a device of the class described, a sweep bar having a spaced series of projecting blades pitched to move material longitudinally and a blade at one end of said sweep bar having a similar pitch and extending beyond the end of said bar.

17. An ice cream freezer having, in combination, a freezer cylinder, an inlet mainly communicating with said cylinder at a point below the uppermost portion of said cylinder, and a passageway from said cylinder to said inlet above the level of the main communication.

18. A freezer having, in combination, a cylinder, an inlet communicating at its lower end with said cylinder below the upper level of said cylinder, a passageway above the lower end of said inlet, and means for maintaining the level of material in said inlet below the level of said passageway.

19. A freezer having, in combination, a receptacle, an inlet passage communicating with said receptacle at two spaced points, and means for maintaining a circulation between said inlet passage and said receptacle, said inlet passage being readily accessible.

20. In a freezer, an enclosed receptacle, a passage way adjacent one end of said receptacle, and means for continuously circulating a small portion of the contents of said receptacle into and out of said passageway whereby the condition of the contents of said receptacle may be readily ascertained.

21. A freezer having, in combination, a cylinder, an inlet communicating with said cylinder below the upper level thereof, an auxiliary passage way establishing communication between said inlet and said cylinder adjacent the upper level thereof whereby when said cylinder is filled full material will flow into said inlet from the upper portion of said cylinder, and agitating means in said cylinder adapted to withdraw material from the lower end of said inlet.

22. A freezer having, in combination, a receptacle, one end wall of said receptacle having an outlet flush with the bottom of said receptacle and agitating means in said receptacle including inclined blades adapted to sweep over the bottom of said receptacle, the end ones of said blades being extended to pass said outlet and assist in emptying said receptacle.

23. A freezer having, in combination, a cylinder, scraping and agitating means extending from one end of said cylinder throughout a portion of the length thereof, agitating means moving adjacent the periphery of said cylinder and extending through the remainder of the length thereof, and an outlet flush with the bottom of said cylinder in proximity to the path of said last named agitating means, said last named agitating means tending to move material longitudinally toward said outlet.

In testimony whereof, I have hereunto set my hand.

THEODORE L. VALERIUS.